Feb. 12, 1924.
T. A. REID
1,483,480
ELECTRIC FURNACE CONTROL SYSTEM
Filed April 18, 1922
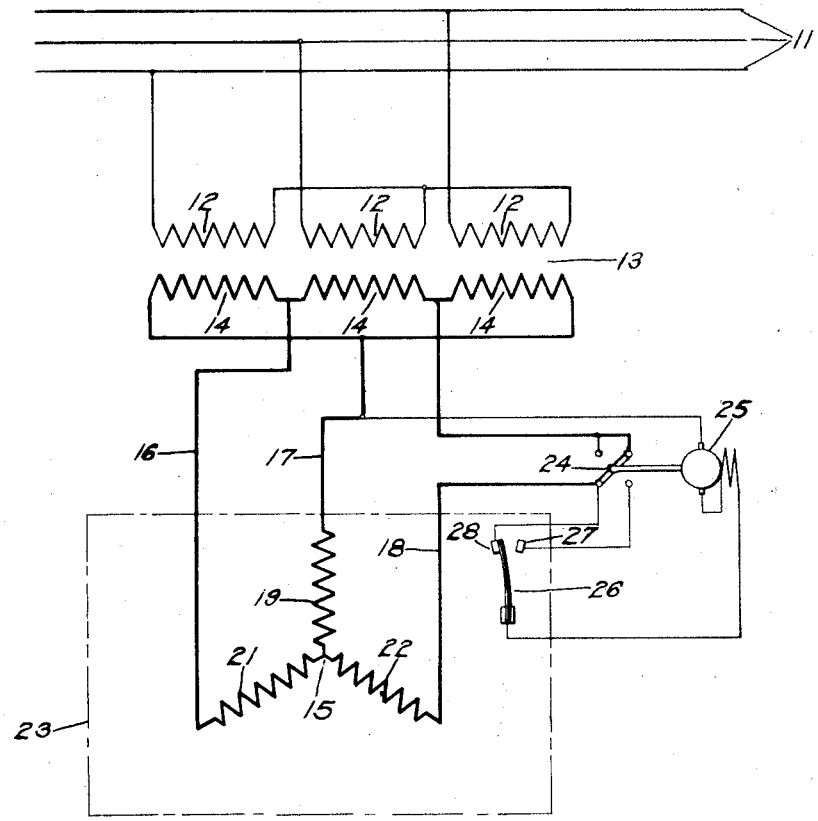
WITNESSES:
C. N. Cochran
N. M. Biebel
INVENTOR
Thomas A. Reid
BY
Chesley G. Carr
ATTORNEY Patented Feb. 12, 1924.

1,483,480

UNITED STATES PATENT OFFICE.

THOMAS A. REID, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-FURNACE CONTROL SYSTEM.

Application filed April 18, 1922. Serial No. 555,513.

*To all whom it may concern:*

Be it known that I, THOMAS A. REID, a citizen of the United States, and a resident of Wilkinsburg, in the county of Allegheny and State of Pennsylvania, have invented a new and useful Improvement in Electric-Furnace Control Systems, of which the following is a specification.

My invention relates to electrically heated devices and particularly to methods of controlling the temperature of electrically heated devices, and it has for its object to provide a relatively simple method of controlling the energy input into an electrically heated device to maintain a substantially constant temperature therein.

In practising my invention, I provide three star-connected, substantially equal, resistors, the free terminals of which are connected to a three-phase source of electric energy of a suitable potential. In one of the connecting leads I place a suitable circuit-controlling device which may be controlled either manually or automatically.

The single figure of the drawing illustrates, disgrammatically, a method of connection and of control embodying my invention.

A three-phase supply circuit, designated generally by the numeral 11, is connected, in the usual maner, to the primary windings 12 of a three-phase transformer designated by the numeral 13. The secondary windings 14 of the transformer may be connected in delta and may be connected to a suitable three-part resistor 15 by conductors 16, 17 and 18, respectively.

The resistor or heating element 15 comprises three substantially equal resistor members 19, 21 and 22, which are connected in star with each other. The heating element 15 may be operatively associated with a device to be heated, indicated by the rectangular figure 23, intended to represent diagrammatically either an electric furnace or any other electrically heated device.

In one of the conductors connecting the transformer and the heating element, as, for instance, in the conductor 18, I place a circuit-interrupting device 24, here illustrated as a motor-operated snap switch of the type disclosed and claimed in copending application Serial No. 328,023, filed, Oct. 2, 1919, by R. A. Bolze and E. W. Denman, and assigned to the Westinghouse Electric & Manufacturing Company. The circuit-interrupting device comprises a snap switch 24 actuated by a relatively small motor 25, the operation of which is controlled by a suitable thermostatic member, here illustrated as a bimetallic strip 26, selectively engaging a low-contact terminal 27 or a high-contact terminal member 28, in accordance with the temperature of the electrically heated device. The thermostatic strip 26 is illustrated as operatively engaging the high-contact terminal 28, closing an energizing circuit through the motor 25 and causing it to operate to move the contact bridging member of the switch 24 to a position substantially 90° from the position illustrated in the drawing, thereby interrupting the circuit through the conductor 18.

In order to explain the operation of the system, it will be assumed that the voltage difference between the respective conductors 16, 17 and 18, as determined by the secondary windings of the transformer 13, equals E. We may also assume that the ohmic resistance of the resistor members 19, 21 and 22 equals R. When the circuit interrupting device 24 is in a position illustrated in the drawing, the voltage across each of the resistors 19, 21 and 22 equals .577 E. Consequently, the power input into the heating element 15 equals 3 x .577 x E x I where I represents the current traversing each of the resistors. I, by Ohm's law, equals $$\frac{.577 \times E}{R}.$$

Substituting in and simplifying the above formula for the power input, we obtain $\frac{E^2}{R}$. If the temperature of the electrically heated device or furnace increases to a predetermined value such that the bimetallic strip 26 operatively engages the contact terminal member 28, as illustrated in the drawing, the motor will operate to cause the switch to interrupt the circuit through the conductor 18 and two of the resistor members, namely those numbered 19 and 21, will be connected in series-circuit relation to each other across one phase or winding of the transformer. The ohmic resistance of that part of the heating element 15 in circuit is then 2 x R and the applied voltage is E. The power input then equals $$E \times \frac{E}{2R} = \frac{E^2}{2R},$$

an energy input substantially equal to one-half of the former input into the heating element.

By connecting a three-part star-connected heating element, each member of which is substantially equal in ohmic resistance to the others, to a delta connected transformer and interrupting the circuit through one of the conductors, we obtain an energy input varying between a normal of 100% and a minimum of 50%. Temperature-controlled means actuated by the heating element or a suitable part of the device being heated may be employed to automatically effect the interruption and the closing of the circuit through one of the conductors to vary the input between the above percentage limits and to thereby maintain the temperature of the apparatus or furnace substantially constant.

I claim as my invention:

1. In an electrical heating system, in combination, a three-phase transformer secondary, a plurality of substantially equal star-connected resistor sections, conductors for connecting the free ends of said resistor sections to said transformer secondary, and thermally actuated means operatively connected in one of said conductors for interrupting the circuit therethrough.

2. In an electrical heating system, in combination, a three-phase transformer secondary, a plurality of substantially equal star-connected resistor sections, conductors for connecting the free ends of said resistor sections to said transformer secondary, and electric means thermally controlled by said resistor sections for reducing the energy delivered thereto.

3. In an electrical heating system, in combination, a three-phase transformer secondary, a plurality of substantially equal star-connected resistor sections, conductors for connecting the free ends of said resistor sections to said transformer secondary to deliver to said resistor a predetermined amount of energy, and thermally controlled electric means for reducing the amount of energy to substantially one-half said predetermined amount.

4. In an electrical heating system, in combination, a three-phase transformer secondary, a plurality of substantially equal star-connected resistor sections, means for permitting substantially equal amounts of current to flow through each of said resistor sections, and thermally controlled electric means for permitting current to flow through only two of said sections in series-circuit relation.

5. The method of regulating the temperature of an electrically heated device which comprises delivering three-phase energy to the three terminals of a resistor comprising three, substantially equal, star-connected, resistor sections until a predetermined maximum temperature is reached and then delivering single-phase energy to a portion of said resistor sections until a predetermined minimum temperature is reached.

6. The method of regulating the temperature of an electrically heated device which comprises delivering three-phase energy to the three terminals of a resistor comprising three, substantially equal, star-connected, resistor sections until a predetermined maximum temperature is reached and interrupting the circuit to one of said terminals to reduce the energy input to substantially one-half of the normal value until a predetermined minimum temperature is reached.

In testimony whereof, I have hereunto subscribed my name this 14th day of April 1922.

THOMAS A. REID.